United States Patent [19]

Nakamura

[11] 4,365,894
[45] Dec. 28, 1982

[54] METHOD FOR CONTROLLING TONER CONCENTRATION

[75] Inventor: Hiroya Nakamura, Hachioji, Japan

[73] Assignee: Konishiroku Photo Industry Co., Ltd., Japan

[21] Appl. No.: 154,146

[22] Filed: May 28, 1980

[30] Foreign Application Priority Data

May 31, 1979 [JP] Japan .................................. 54-66856

[51] Int. Cl.³ ...................... G03G 15/00; G03G 27/32
[52] U.S. Cl. ...................................... 355/77; 355/140
[58] Field of Search ................. 355/3 R, 3 DD, 14 R, 355/14 D, 77

[56] References Cited

U.S. PATENT DOCUMENTS

| | | | |
|---|---|---|---|
| 2,956,487 | 10/1960 | Giaimo | 355/14 D |
| 3,045,644 | 7/1962 | Schwertz | 355/4 X |
| 3,348,521 | 10/1967 | Hawk | 118/7 |
| 3,348,523 | 10/1967 | Davidson et al. | 118/7 |
| 3,360,652 | 12/1967 | Bernous | 250/219 |
| 3,801,196 | 4/1974 | Knapp et al. | 355/3 |
| 4,026,642 | 5/1977 | Tanaka et al. | 355/3 R X |
| 4,050,806 | 9/1977 | Miyakawa et al. | 355/14 |
| 4,166,691 | 9/1979 | Ebi et al. | 355/3 DD X |
| 4,215,930 | 8/1980 | Miyakawa et al. | 355/14 E X |
| 4,239,372 | 12/1980 | Iwai | 355/14 R |

Primary Examiner—Fred L. Braun
Attorney, Agent, or Firm—Jordan B. Bierman; Linda Bierman

[57] ABSTRACT

A method of controlling toner concentration in an electrophotographic recording apparatus includes placement of a reference image in the form of a density pattern on the electrostatic member preceding or following an information image thereon. Photoelectric sensing of this pattern controls selective addition of toner to the developer and variation in the pattern to maintain a predetermined concentration of toner therein in accordance with the sensed density of the developed reference image. The pattern is preferably in the form of pulses to avoid edge effects.

3 Claims, 10 Drawing Figures

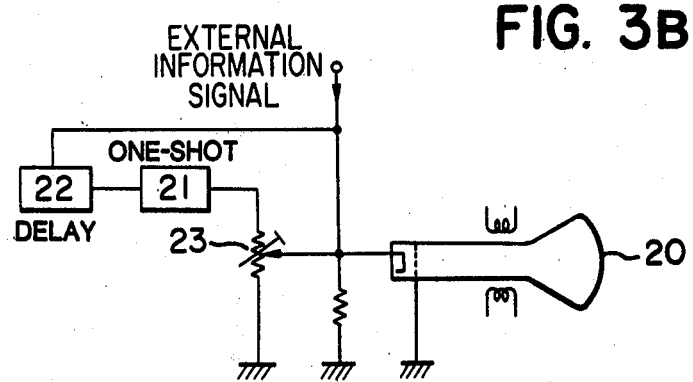
FIG. 3B
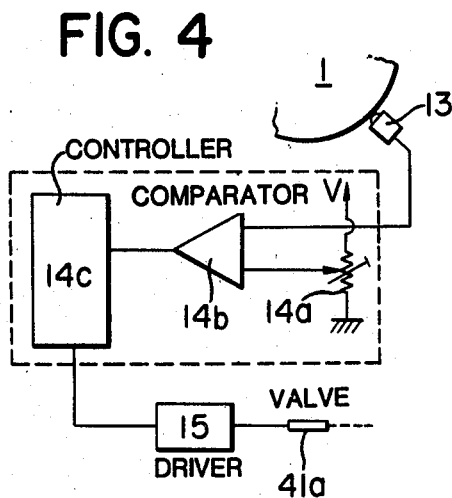
FIG. 4
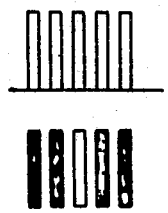
FIG. 5A
FIG. 5B
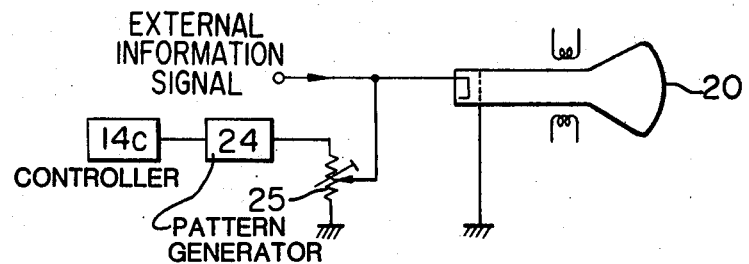
FIG. 6

METHOD FOR CONTROLLING TONER CONCENTRATION

BACKGROUND OF THE INVENTION

1. Field of the Invention

The present invention relates to an electrophotographic recording apparatus which records externally-supplied electical signal information on a recording sheet as of plain paper by electrophotographic processing, and more particularly to a method of controlling the toner concentration of developer so as to maintain constant the stable quality of an image produced on the recording paper.

2. Prior Art of the Invention

In apparatus such as electrophotographic printers, compound information recording apparatus, facsimile machines, and the like which record external information by an electrophotographic process, a visible image recorded on a sheet of recording paper is obtained by developing externally-supplied information formed on a photosensitive member with a developer consisting of toner particles and carrier particles. In order to maintain the quality of the recorded image and, particularly a constant density of the image, the concentration of the developer (i.e. of the toner thereof) must be kept substantially constant. Various methods of detecting such toner concentration have heretofore been suggested, such, for example, as an optical method by which the amount of light transmitted through a transparent disc to which toner is attached; is converted to an electric current an electrical method by which the variation of electric current flowing through the developer is measuring (taking advantage of the insulation characteristics of the toner) and a magnetic method by which the magnetic permeability of the developer is measured (based upon known variation thereof as the toner concentration in the developer varies). On the other hand, insofar as controlling the toner concentration in an information recording apparatus utilizing an electrophotographic process, only a method similar to the aforementioned optical method is understood to have been suggested.

The practice of such any of such conventional toner concentration detecting methods, requires a special detecting element and detecting circuit requiring space therefor within the recording apparatus, thus increasing the size and cost of such apparatus.

SUMMARY OF THE INVENTION

In accordance with the present invention, an information recording apparatus utilizes an optical scanning means or electric discharge means for recording externally-supplied information which is, for example, temporarily stored in a memory of an electronic microcomputer. An electrostatic latent image of a reference density or concentration signal is formed on a photosensitive member (or a member capable of retaining an electrostatic charge) prior or subsequent to the formation of an external information signal latent image, and is thereafter developed with the development of the external information signal image to form a visual reference density region. The density this developed region is then detected by photoelectric means, from which detection control of the toner concentration is effected. According to the present invention, the requirement of conventional detecting methods for special detecting elements or detecting circuits is unnecessary because the method of the invention is capable of providing both the reference density signal in the form of an electric signal, and a reference density region by utilizing the electrophotographic process normally used in the processing of information images. The present invention, however, merely requires photoelectric means for detecting the density of the reference density region. Consequently, the detecting means itself may be of a very simmple construction, is economically advantageous, and is further able to provide the reference density signal in the form of an electric signal, thus permitting the formation of a reference density region free of the so-called "edge effect" whereby the edge portion of an electrophotographic image edge portion is deeply darkened with respect to the image interior which is notably lighter or washy.

An embodiment of the present invention is described hereinafter with reference to the drawings.

BRIEF DESCRIPTION OF THE DRAWINGS

FIGS. 3A and 3B semi-schematically illustrate embodiments of the reference density or concentration signal generating circuits;

FIG. 4 semi-schematically illustrates an embodiment of the control means;

FIGS. 5A and 5B show detailed examples of the reference density signal and the corresponding patterns thereof;

FIG. 6 semi-schematically illustrates an embodiment of the reference density signal generating circuit;

DETAILED DESCRIPTION OF THE PREFERRED EMBODIMENTS

Figure 1:
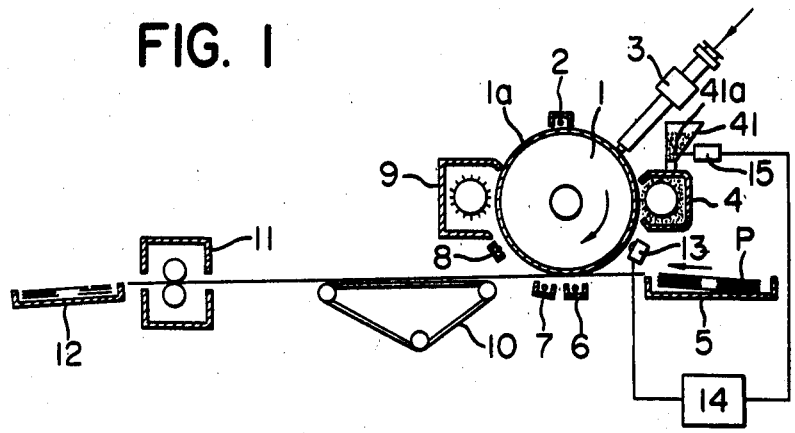
FIG. 1 of the drawings diagrammatically shows an information recording apparatus constructed in accordance with the teachings of the present invention.

Around a photosensitive drum 1 (which carries on its surface a photosensitive member 1a the combinations hereinafter being conveniently designated, at times photosensitive drum 1. There are successively disposed a charging electrode 2 for uniformly charging drum 1, a scanning reproducing device 3 (such as a cathode ray tube (CRT), an optical fiber tube (OFT), or the like) for forming on member 1a an image corresponding to an external information signal developing means 4 for developing the electrostatic latent image formed by scanning reproducing device 3 on photosensitive member 1a, a transfer electrode 6 for transferring the developed external information signal image onto a recording paper P supplied from recording paper feeding tray 5, a separation electrode 7 for separating the recording paper bearing the transferred image from photosensitive drum 1, an electrode 8 for neutralizing or reducing residual charge remaining on the surface of photosensitive member 1a from which the recording paper P has been separated, and cleaning means 9 for removing the residual toner from photosensitive member 1a. On the developing means 4, toner replenishing means 41 for replenishing toner is disposed. The recording paper P that has been separated from photosensitive member 1a is transported by transport means 10 to fixing means 11, by the action of which the toner image is fixed on the recording paper, and finally the paper is ejected to a receiving tray 12.

A photoelectric detector 13 is disposed close to the surface of photosensitive member 1a between developing means 4 and transfer electrode 6. Photoelectric detector 13 may be of a conventional type composed of a light emitting element and a light receiving element the output of which is supplied to a control means 14. Toner replenishing means 41 is provided with driving means 15 which operates, in accordance with a control signal from control means 14, a valve 41a so as to open the valve means when necessary to supply toner to developing means 4.

Figure 2:
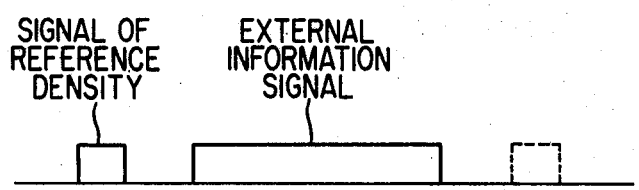
FIG. 2 is a graphical illustration showing the relationship between the reference density signal of the present invention and an external information signal.
Figure 3A:
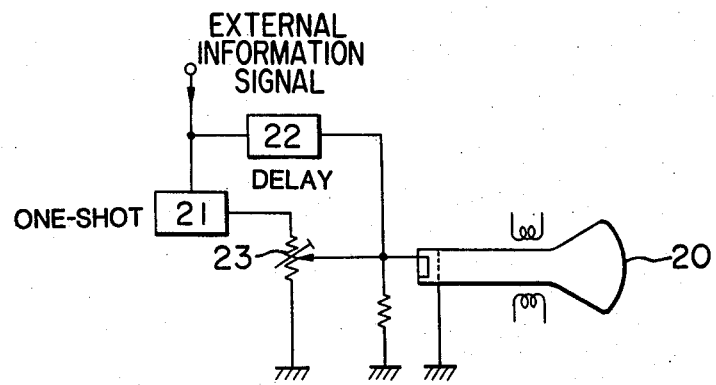

The toner concentration control method of the present invention is such that, as shown in FIG. 2, a reference density signal is inserted prior or subsequent the external information signal to be supplied to scanning reproducing device 3, and an optical image corresponding to the reference information signal is projected onto photosensitive member 1a prior or subsequent to the signal image corresponding to the external information. The latent image formed on member 1a from the reference signal is thereafter developed by developing means 4 to form a visible reference density region on the surface of photosensitive member 1a. The reference density signal, in this embodiment of the invention, is a luminance signal having a definite amplitude 3A shows a circuit for inserting the reference density signal prior to the external information signal, and FIG. 3B shows a circuit for inserting the reference density signal after the external information signal. In these circuits, reference numeral 20 denotes a cathode ray tube which is an integral part of scanning reproducing device 3, 21 is a monostable multivibrator or one-shot connected to a source generating the external information signals, 22 is a delay circuit the input of which is connected to a line extending from the source and the output of which is grounded through a resistor (no reference symbol), 23 is a variable resistor adjustable for setting the desired toner concentration. The wiper of variable resistor 23 is connected to the cathode of CRT 20 so as to vary the potential thereof in conjunction with the output of delay circuit 22. The reference density region reflects the toner concentration of the developer then in use because the region is developed with the very developer that develops the external information image. The density of this reference density region is converted by photoelectric detector 13 into an electric signal to be supplied to control means 14 which may be implemented by such a circuit as is shown in FIG. 4, comprising a sensitivity setter 14a, comparator 14b, and a microcomputer controller 14c. The output of photoelectric detector 13 is compared at comparator 14b to the reference value determined by sensitivity setter 14a, and the output of comparator 14b is fed to microcomputer controller 14c. The output of controller 14c is supplied to driving means 15 (which includes a solenoid) to open and shut toner replenisher valve 41a. Sensitivity setter 14a for setting the desired toner concentration when replenished is composed of a variable resistor.

Although the reference density signal for the reference image may be a luminance signal having a definite amplitude lasting a certain period of time as shown in FIG. 2, if the reference signal has a plurality attenatively of definite amplitude pulses as shown in FIGS. 5A and 5B, it provides the advantageous ability to prevent the so called "edge effect" phenomenon. To the reference density signals of FIGS. 5A and 5B, the corresponding reference density regions are formed as shown at the lower portions of the same figures. In addition, to those shown in the drawings, the reference density region may be formed as on arbitrary pattern by properly changing and combining the number of pulses, their amplitude, their time and periods, and the variation and selection of such patterns are readily achievable.

An example of a circuit for generating the reference density signals shown in FIGS. 5A and 5B is described hereinafter.

In FIG. 6, a reference density region pattern generator 24 is connected to microcomputer controller 14c to generate a pattern signal in accordance with the control signal from the controller 14c. In this case, the reference density signal may be inserted at an arbitrary position either before or after the external information signal by changing the timing of the reference density beginning or initiating signal. Reference numeral 25 denotes a variable resistor for setting the desired toner concentration.

Figure 7:
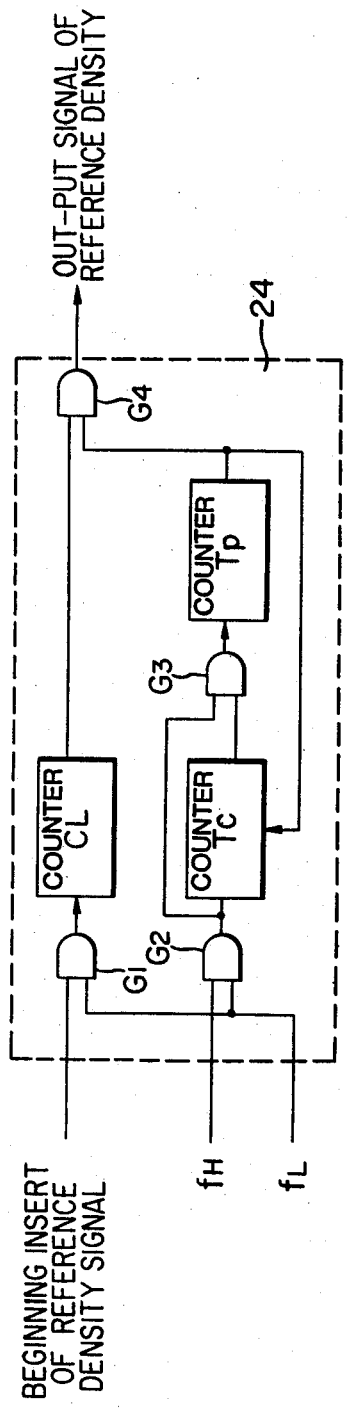
FIG. 7 semi-schematically illustrates the internal structure of the reference density signal generating circuit shown in FIG. 6.

FIG. 7 is a block diagram showing the internal structure of reference density region pattern generator 24, wherein counter CL is a circit for determining the formation of the reference density region by the number of scanning couts from the insertion of the reference density region; i.e., the length of the reference density region. TC is a counter for determining the position at which the reference density region should be formed, TP is a counter for determining the width of the reference density region, and G1, G2, G3, and G4 are gates.

Figure 8:
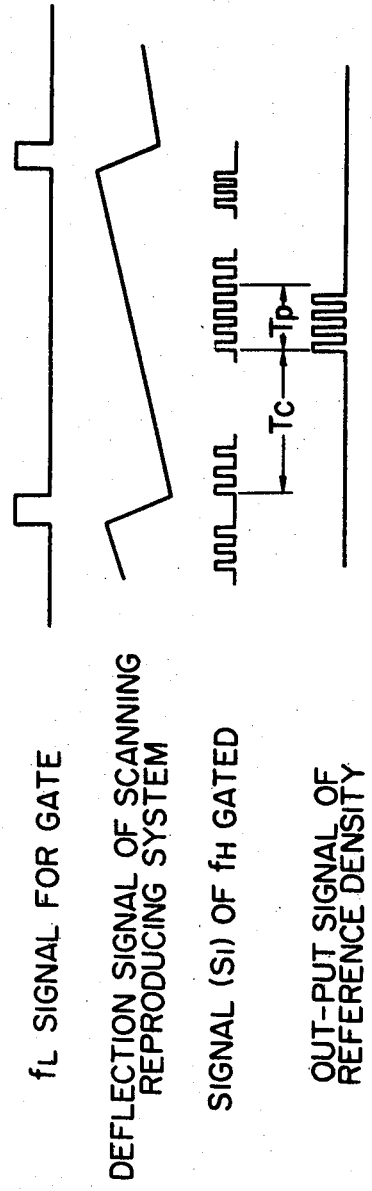
FIG. 8 graphically depicts the formation of the reference density signal.

The operation is described below, in reference to FIGS. 7 and 8, wherein fL is a synchronizing signal of one scanning corresponding to the deflection signal of scanning reproducing device 3 in the drawing, and wherein fH is a high speed pulse signal, generated synchronously with fL, the former being gated together with the latter in gate G2 to yield waveform S1. Counter TC counts waveform signal S1 to open gate G3 when reaching the given count number (postion setting) to feed signal S1 to counter TP, which outputs the number of pulses of signal S1 corresponding to the designated width of the reference density region, which output is then gated together with the signal of counter CL in gate G4 to output the desired reference density signal.

The above described embodiments includes an optical scanning reproducing device————such as an optical fiber tube (OFT), thin wall tube (TWT), laser beam scanning device, etc.,————used as the scanning reproducing means for converting the electric signal of external information into an optical image. It should, however, be understood that the present invention is also applicable to such recording means as the electrostatic recording facsimile type which directly electrostatically records external information. In addition, in this invention, the reference density signal should be inserted either before or after the external information signal in order to avoid the placement of unnecessary information on the recording paper.

According to the present invention, by merely inserting the reference density signal either before or after the external information provided in the form of an electric signal, the reference density region may be formed through an ordinary electrophotographic process.

Thus, merely by providing a photoelectric means or circuit for detecting the density of the reference density region the toner concentration of developer can be detected, and the method of this invention is accordingly simple and economical as compared to conventional methods for the detection of toner concentration. Further, being in the form of an electric signal, the reference density signal enables ready modification of the pattern of the reference density region by varying and combining its electrical characteristics (such as amplitude, period, etc.) and also enables prevention of the edge effect in the reference density region and an increase in the accuracy of the detection and control of toner concentration. In addition, those skilled in the art will recognize that a fixed resistor may be used in place of each disclosed variable resistor.

What is claimed is:

1. A method of controlling the concentration of toner used in an electrophotographic recording apparatus having a member for receiving and retaining an electrostatic image, reproducing means for receiving information supplied in the form of an electric signal and for impressing an electrostatic image of said electric signal information on said member, and a developing means for developing an electrostatic image carried on said member, said method comprising the steps of:

energizing the reproducing means to form a reference density region on said member, synchronizing the energization of said reproducing means with the signals supplied thereto so that the electrostatic image and the reference density region are sequentially formed on said member.

developing the reference density region by the same means for developing the electrostatic image, sensing the toner density of the developed reference density region, producing signals representative of the sensed toner density, comparing said produced signals with signals representative of a desired toner density, producing a signal representative of the difference between the signal representative of said sensed toner density and the desired toner density, adding toner in accordance with said last-mentioned signal and varying at least one parameter of the reference density region in accordance with said last-mentioned signal.

2. Method according to claim 1 in which the reference density region is formed as a pattern of pulses.

3. Method according to claim 2 in which the width of said pattern is varied in accordance with the aforesaid last-mentioned signal.

* * * * *